March 20, 1951     R. M. SQUIRES     2,545,900
APPARATUS FOR COLLECTING SOIL GAS SAMPLES
Filed Jan. 24, 1947
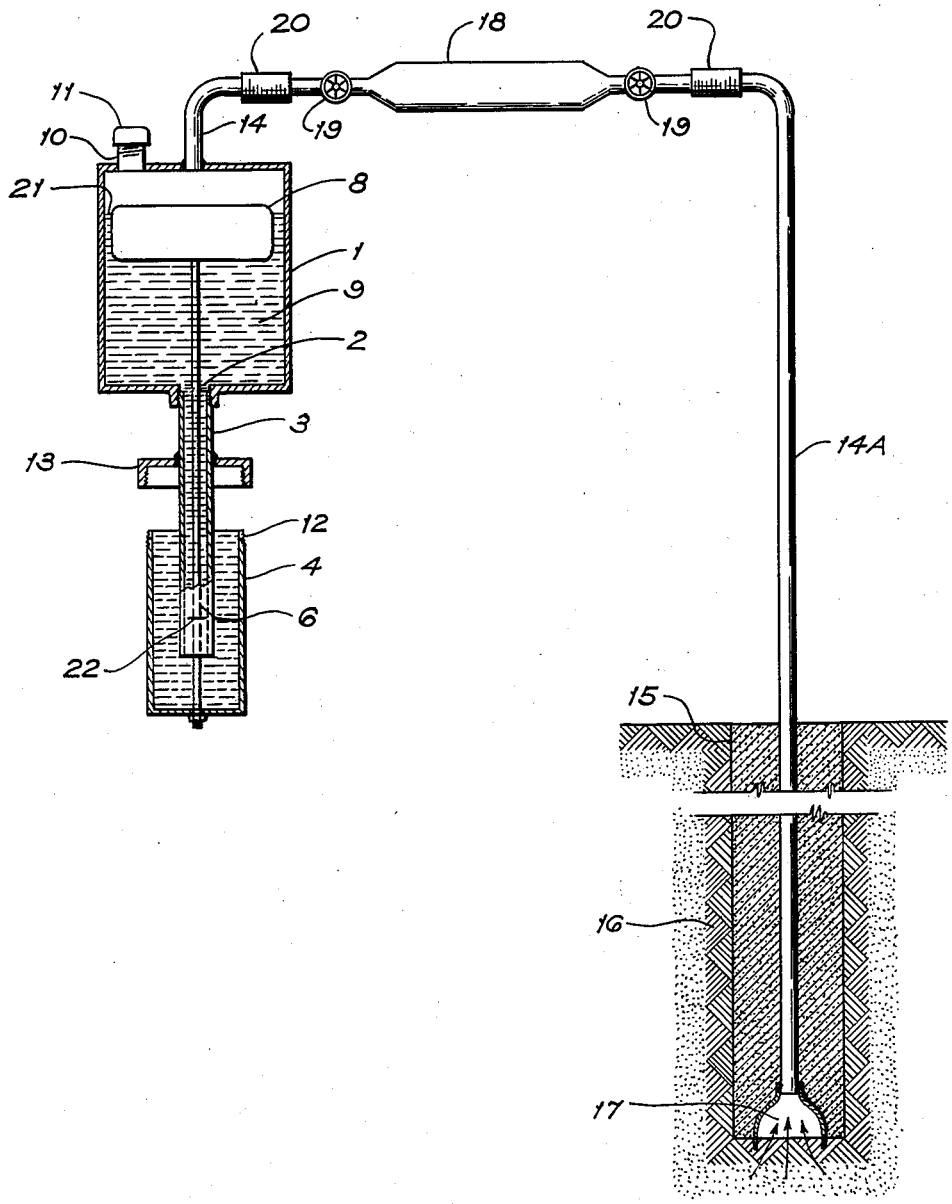
Rodney M. Squires
INVENTOR.
BY Sidney A. Johnson
ATTORNEY Patented Mar. 20, 1951

2,545,900

UNITED STATES PATENT OFFICE 2,545,900

APPARATUS FOR COLLECTING SOIL GAS SAMPLES

Rodney M. Squires, Dallas, Tex., assignor, by mesne assignments, to Socony-Vacuum Oil Company, Incorporated, New York, N. Y., a corporation of New York Application January 24, 1947, Serial No. 724,010

3 Claims. (Cl. 73—421.5)

1

The invention relates to the desorption of gases under uniform conditions and is particularly adapted for use in geochemical prospecting for petroliferous deposits. More particularly, the invention relates to an apparatus for withdrawing soil gases from the earth. Still more particularly, the invention relates to novel apparatus by means of which a definite volume of soil gas may be withdrawn from the earth under constant pressure conditions.

It is well known in the petroleum prospecting art that the presence of certain hydrocarbons, particularly ethane, in soil gas is indicative of the existence of a petroliferous deposit. Other components of soil gas, such as hydrogen, oxygen, helium and carbon dioxide, have also been suggested as being related to and indicative of the existence of petroleum deposits. The method of detecting and measuring these indicative gases in the earth in relation to petroleum deposits is known in the geochemical prospecting art as soil gas surveying. It is the usual practice in conducting a soil gas survey to collect a series of soil gas samples in a survey area and to analyze the samples to determine the amount of one or more of the significant indicating gases therein. The samples are generally taken at shallow depths in the earth at points set out in the prospect area according to some definite plan or pattern. By comparing the analytical results in relation to the sampling point locations in the field, indications are obtained as to the presence and location of a petroliferous deposit.

It has been a major problem in soil gas survey work to control the conditions of sampling so as to eliminate erroneous indications otherwise introduced into the analytical results. It has now been found that the composition of the gas sample obtained is markedly affected by two factors in particular, viz. (1) the pressure at which the gas sample is withdrawn from the sampling hole and (2) the amount of gas so withdrawn. With reference to the first factor, it will be appreciated that where a relatively high vacuum is employed to draw the gas from the earth, the sample obtained will contain a greater proportion of those gases which are strongly adsorbed in the pores of the soil, while the use of pressures only slightly below atmospheric will increase the proportion of the less strongly adsorbed gases in the sample. As to the second factor, it is advantageous that the volume of gas withdrawn from the earth should be controlled so that a sufficient amount is taken to sweep the conduit system free of air. At the same time, the taking of too large an amount of gas should be avoided so as to restrict the zone of sampling. By taking a constant volume of gas each time, as is done by means of my new sampling device, both of these factors are accurately and uniformly controlled.

It is an object of this invention to provide a means for collecting soil gas samples under constant reduced pressure conditions so that the samples obtained in any one series will be properly comparable. Another object is to provide means for collecting a definite known volume of gas under constant pressure conditions. Other and further objects of the invention will become apparent from the following description of the invention taken in connection with the accompanying drawing.

Referring to the drawing, the apparatus of the invention consists of a gas holding unit or vessel 1 preferably made of some relatively light metal such as aluminum or sheet steel. The vessel 1 is provided with an internally threaded opening at the bottom into which is threaded the pipe 3 extending for a substantial distance therebelow. The pipe 3 is preferably slightly longer than the depth of the vessel 1. A cup 4 encircles the end of pipe 3 and is suspended from a float 8 located within vessel 1 by means of a metal rod 6 passing through pipe 3. The rod 6 should have a length slightly greater than the distance from the bottom of the float when positioned in the upper portion of vessel 1 to the end of the pipe 3. In this manner when vessel 1 is liquid-full the bottom of cup 4 will be slightly below the open end of the pipe 3. The float 8 should have such dimensions that its buoyancy is just sufficient when it is substantially completely submerged to float and to support the rod 6 and the cup 4 when the latter is full of water.

The vessel 1 is provided at its other or upper end with a short threaded inlet pipe 10 provided with a suitable threaded cap 11 forming a substantially air tight seal for a purpose to be hereinafter described. The cup 4 may be provided with a suitable lip 12. An internally threaded cover 13 provided with a cut out center portion is fitted over pipe 6 and welded thereto. This cover is of a size to fit vessel 4, the upper portion of which is externally threaded and adapted to be screwed into the cover 13.

Vessel 1 is also provided at its upper end with a short piece of metal pipe 14 extending through the top and suitably held in place as by welding. This pipe serves as an inlet for the soil gas.

In order to obtain the gas sample a conduit 14A of suitable length is inserted into the borehole 15 sunk to a desired relatively shallow depth in the earth 16 from whence it is desired to collect a gas sample for analysis. The end of the conduit or pipe 14A extending into the borehole is preferably provided with a suitable funnel shaped end member to form a collecting chamber 17 above which mud or other suitable packing material may be placed to isolate the zone from which it is desired to collect the gas sample from contamination from above.

A sample tube 18 into which it is desired to collect the gas sample is then inserted in the line 14—14A. The sample tube is provided with suitable valves 19 at each end. Short pieces of rubber tubing 20 having an internal diameter adapted to tightly fit the conduits 14 and 14A may be employed to connect the sampling tube to the respective conduits.

In operation, cap 11 is taken off and water poured into vessel 1 until cup 4 is liquid full after which cup 4 is raised into contact with and threaded into cap 13. More water is then poured into inlet 10 until vessel 1 is also liquid full. Cap 11 is then screwed on and the sample taking device is ready for use.

After the zone from which the sample is to be removed has been prepared, the sample tube 18 is attached at one end to the free end of the tube 14A and to the sample withdrawing apparatus at its other end. The valves 19 are opened. The cup 4 is then unscrewed from cover 13 and held suspended by the buoyancy of the float 8. Subatmospheric pressure exists in line 14 equal to atmospheric pressure minus the pressure head exerted by a column of water whose height is the distance between the water level 21 in vessel 1 and the level of lip 12 in vessel 4 (neglecting the vapor pressure of the water in vessel 1). Under this mild and constant vacuum the soil gas sample is evacuated into collecting chamber 17 and passes through conduit 14A into sampling tube 18. Simultaneously water overflows lip 12 as gas flows into vessel 1, maintaining the level of the water column constant.

The internal volume of vessel 1 should be sufficiently great to cause the soil gas to sweep out substantially all of the air originally present in the sample collecting chamber 17, the conduit 14A, and the sampling tube 18 into the vessel 1. In order that a constant action will be exerted in this respect the pipe 3 is preferably provided with a suitable mark 22 near the bottom thereof so that when the water level at lip 12 reaches this mark the valves 19 on the sampling tube may be closed and the sampling stopped. In this manner not only will all of the samples be withdrawn under a constant pressure differential but also a substantially constant volume of gas will be withdrawn and used to sweep out the apparatus, thus insuring highly uniform sampling conditions.

The lines 14 and 14A should be of an internal diameter sufficiently large to permit substantially unrestricted flow of gas from the sample collecting zone to the sample withdrawing apparatus. In this manner no significant pressure drop will occur in the apparatus which might tend to introduce significant pressure variations particularly where line 14A varies in length. On the other hand the diameter of these conduits should not be so large that the volume of gas therein and in the test zone and sampling tube is relatively large compared to the volume of the sampling vessel 1. Glass or metal tubing having an internal diameter of from 8 to 15 mms. is satisfactory. Sampling tubes having a volume of from 10 to 500 mls. depending upon the subsequent analytical technique to be employed, give an adequate sample volume and are satisfactory for use.

The amount of vacuum under which the sample is withdrawn may be varied by varying the dimensions of the sample withdrawing apparatus. This may be conveniently done by varying the length of the pipe 3 and the rod 6. These are therefore conveniently threaded so that they may be readily unscrewed and longer or shorter pipes and rods used which will vary the height of the liquid column between the surfaces 21 and 12. Generally, I have found that a liquid level difference of from about 10 to about 30 inches (equal to a vacuum of from about 20 to 60 mms. of mercury) is satisfactory.

The gas samples taken in accordance with the foregoing technique are subsequently analyzed and the analytical results compared with samples taken in a similar fashion from a number of sampling stations in the prospect area. In this way anomalous variations in the soil gas content of various indicating gases, such as ethane, are detected and interpreted in relation to petroliferous deposits.

In conducting numerous soil gas surveys, I have found that when a series of soil gas samples are taken in the manner afforded by my invention, i. e. when a constant volume of soil gas is withdrawn under constant pressure conditions, the indications obtained by the subsequent analyses of the samples are more reliable than was possible by the use of prior art sampling techniques. Repeated tests utilizing my new sampling device over the same survey area have shown the results to be highly reproducible.

Another advantageous use of the apparatus of the invention is its utility in obtaining rough but rapid indications of relative soil permeability. Thus, since the apparatus conveniently withdraws a constant volume of gas under constant reduced pressure conditions, the time required to withdraw the gas sample is indicative of the permeability of the soil in the particular sampling zone.

The foregoing description of the specific apparatus employed for withdrawing gas samples for analysis at constant pressure is to be considered as but illustrative. Many modifications of the structural details thereof will be readily apparent to those skilled in the arts. The essential feature is the use of a barometric leg depending from the bottom of the gas collecting chamber and the provision of means operated by a float in the collecting chamber serving to keep the free end of the barometric leg exposed to the atmosphere at a constant vertical distance below the level of the liquid in the collecting chamber.

While I have described the use of water as the liquid to be employed in the chamber since this represents the cheapest and most readily available liquid, other liquids may obviously be substituted with the restriction that the liquid should not have an excessive vapor pressure at the atmospheric temperatures to which the apparatus is subjected. By the use of liquids having a specific gravity in excess of one the amount of vacuum applied to the sampling apparatus may be increased where it is desirable to do so.

The apparatus of the invention is simple to set up and operate in the field. It is readily portable and may be provided with a suitable support, not shown, for field use.

Having now fully described my invention and the manner of operation thereof what I claim as new and wish to secure by Letters Patent is:

1. A device for withdrawing gas from the earth at a constant pressure which comprises a gas collecting chamber having an inlet at the top; a hollow pipe extending from the bottom of said chamber; a float in said chamber; a generally cylindrical cup; a rod secured to the bottom of said cup and extending vertically upwards therefrom through the pipe for interconnecting said cup and said float; said float being so proportioned as to displace a quantity of water sufficient to equal the weight of the float, the rod, and the cup when filled with water when said float is substantially completely submerged, whereby when said float is buoyed up by the water in the chamber a constant vertical distance will be maintained between the level of the liquid in the chamber and the level of the liquid in the cup.

2. A device for desorbing gas at a constant subatmospheric pressure comprising in combination a gas collecting chamber; an inlet in the top of said chamber; a conduit extending from the bottom of said gas collecting chamber; a substantially cylindrical cup of greater internal diameter than said conduit; a float in said gas collecting chamber; a rod secured to the bottom of said cup and extending vertically upwards therefrom through the conduit for connecting the float to the cup; said float being so proportioned as to displace a quantiy of water sufficient to buoy up the float, the rod and the cup when filled with water whereby when said float is buoyed up by the water in the gas collecting chamber a constant vertical distance will be maintained between the level of the liquid in the gas collecting chamber and the level of the liquid in the cup.

3. A device for withdrawing gas from the earth under constant pressure which comprises a gas collecting chamber having an inlet at the top; a conduit extending from the bottom of said chamber; an open topped vessel of greater diameter than said conduit surrounding the lower portion of the conduit; a float in said chamber adapted to be buoyed up by a liquid; means connecting said float to the bottom of said vessel passing through said conduit whereby when a liquid is placed in said chamber, conduit and vessel a constant vertical distance will be maintained between the liquid level in said chamber and the liquid level in said vessel so long as there is sufficient liquid in the chamber to buoy up the float whereby the pressure in the chamber will be maintained constant irrespective of the height of the column of liquid in the chamber.

RODNEY M. SQUIRES.

REFERENCES CITED

The following references are of record in the file of this patent:

UNITED STATES PATENTS

| Number | Name | Date |
|---|---|---|
| 570,357 | Waller | Oct. 27, 1896 |
| 686,784 | Tryner | Nov. 19, 1901 |
| 1,089,390 | Billings | Mar. 10, 1914 |
| 1,932,582 | Halvorsen | Oct. 31, 1933 |
| 2,141,261 | Clark | Dec. 27, 1938 |
| 2,210,546 | Hassler | Aug. 6, 1940 |
| 2,356,845 | Hines | Aug. 29, 1944 |
| 2,374,227 | Metcalf | Apr. 24, 1945 |
| 2,386,832 | Zaikowsky et al. | Oct. 16, 1945 |
| 2,393,092 | Doin | Jan. 15, 1946 |